US007536417B2

(12) United States Patent
Walsh et al.

(10) Patent No.: US 7,536,417 B2
(45) Date of Patent: May 19, 2009

(54) REAL-TIME ANALYSIS OF WEB BROWSING BEHAVIOR

(75) Inventors: James E. Walsh, Woodinville, WA (US); Jonathan Forbes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 257 days.

(21) Appl. No.: 11/439,341

(22) Filed: May 24, 2006

(65) Prior Publication Data

US 2007/0276790 A1 Nov. 29, 2007

(51) Int. Cl.
*G06F 17/00* (2006.01)
(52) U.S. Cl. .................... 707/104.1; 707/101; 707/102; 707/103 R
(58) Field of Classification Search ................ 707/1–10, 707/100–104.1, 200–206
See application file for complete search history.

(56) References Cited

U.S. PATENT DOCUMENTS

| 6,078,924 | A | 6/2000 | Ainsbury |
| 6,282,546 | B1 | 8/2001 | Gleichauf |
| 6,349,291 | B1 | 2/2002 | Varma |
| 6,502,133 | B1 | 12/2002 | Baulier |
| 6,745,367 | B1 * | 6/2004 | Bates et al. ................. 715/205 |
| 6,768,995 | B2 | 7/2004 | Thier |
| 6,836,894 | B1 | 12/2004 | Hellerstein |
| 2004/0153430 | A1 | 8/2004 | Sayad |
| 2005/0144096 | A1 | 6/2005 | Caramanna, II |
| 2005/0149395 | A1 | 7/2005 | Henkin |
| 2005/0228707 | A1 | 10/2005 | Hendrickson |
| 2007/0016951 | A1 * | 1/2007 | Piccard et al. ................. 726/24 |

FOREIGN PATENT DOCUMENTS

GB 2411542 12/2005

OTHER PUBLICATIONS

FutureSource Products, http://www.esignal.com/futuresource/default.asp.
Clementine; Software Simplifies Sophisticated Data Analysis and Forecasting Using Interactive Graphical Reports, http://www.kdnuggets.com/news/2001/n14/6i.html.
Embedded Business Intelligence and Reporting—Going Beyond Traditional BI for Real-Time Analysis, http://www.dmreview.com/article_sub.cfm?articleID=1034430.

* cited by examiner

*Primary Examiner*—Isaac M Woo
(74) *Attorney, Agent, or Firm*—Shook, Hardy & Bacon L.L.P.

(57) ABSTRACT

A system and method are presented for monitoring user browsing information. Such information can include, but is not limited to, the web pages visited by users, search queries submitted by users, the manner in which users browse the Internet and search for content, as well as any demographic information and interests of the corresponding users. Once a particular type of user browsing information has reached a certain threshold of activity by users, the invention can be configured to detect activity that reaches the threshold and then can increase the monitoring of the information.

14 Claims, 3 Drawing Sheets

REAL-TIME ANALYSIS OF WEB BROWSING BEHAVIOR

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Web advertisers and other third parties sometimes have a vested interest in web user's searching habits. In particular, web advertisers may be interested in knowing popular web pages or search terms that users are accessing and submitting in order to effectively place their advertisements on certain web pages. Conventionally, it may take weeks or months to be able to provide a statistical analysis of web browsing information from a plurality of users. However, third parties, web advertisers in particular, may be interested in being able to receive such statistical information much faster. Therefore, it may be desirable to provide a method in which third parties can receive information that has been updated within hours, minutes, or even seconds from when a request for such information is submitted.

SUMMARY

A system and method are disclosed for monitoring user browsing activity. In an embodiment, the method includes aggregating a plurality of user browsing information such as, but not limited to, the web pages and search queries respectively visited and submitted by users, the manner in which users browse the Internet and search for content, as well as any demographic information and interests of the corresponding users. The method further can be configured to detect a threshold amount of activity for a certain type of user browsing information. Additionally, the method can include increasing the monitoring of the user browsing information once the information has reached the threshold of activity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The invention introduces a system and method for providing a real-time analysis of user browsing information such as, but not limited to, the web pages visited by users, the search queries submitted by users, the manner in which users browse the Internet and search for content, as well as any demographic information and interests of the corresponding users. The invention can be configured to provide such statistical information that can be updated in time intervals of hours, minutes, seconds, or for any other time interval. The invention can also be configured to monitor the changing activity or certain user browsing information and can detect when certain browsing information has changed beyond a particular threshold level. Once a change beyond a threshold level has been detected, the invention can be configured to increase the level of monitoring of the detected user browsing information.

Figure 1:
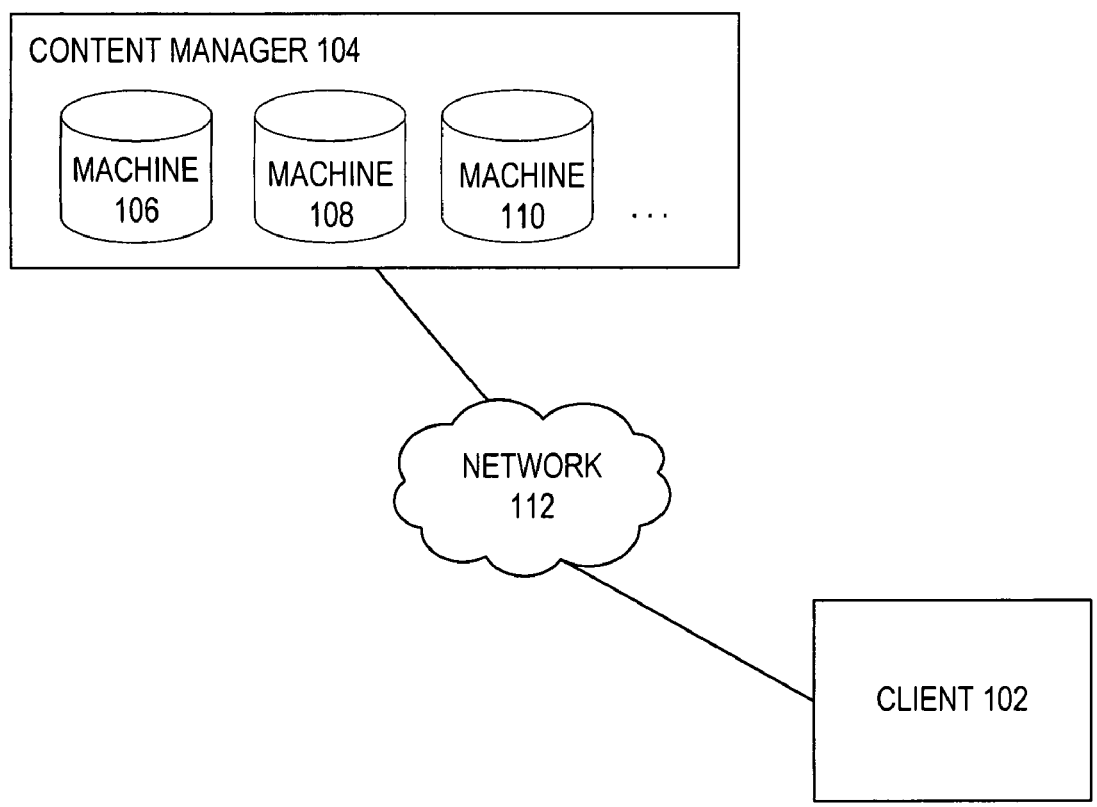
FIG. 1 illustrates an embodiment of a system for implementing the invention.

FIG. 1 illustrates an embodiment of a system for implementing the invention. Client 102 may be or include a desktop or laptop computer, a network-enabled cellular telephone (with or without media capturing/playback capabilities), wireless email client, or other client, machine or device to perform various tasks including Web browsing, search, electronic mail (email) and other tasks, applications and functions. Client 102 may additionally be any portable media device such as digital still camera devices, digital video cameras (with or without still image capture functionality), media players such as personal music players and personal video players, and any other portable media device. Client 102 may be used by any web browsing user or third party. In an embodiment, client 102 may also be a server.

Client 102 can include a communication interface. The communication interface may be an interface that can allow the client to be directly connected to any other client or device or allows the client 102 to be connected to a client or device over network 112. Network 112 can include, for example, a local area network (LAN), a wide area network (WAN), or the Internet. In an embodiment, the client 102 can be connected to another client or device via a wireless interface.

Content manager 104 and machines 106, 108 and 110 may be or can include a server including a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. Content manager 104 can include a plurality of machines such as machines 106, 108, and 110, and can additionally include many more. In an embodiment, content manager 106 can include many thousands of machines. In an embodiment, content manager 106 can comprise at least a petabyte of storage capacity. The plurality of machines within the content manager can be used to process any type of data for the content manager. With the plurality of machines, the content manager can process data in a distributed manner across one or more of the machines. The content manager can be used to process large amounts of data within hours, minutes, or seconds that conventionally could take days, weeks, or months to complete.

Content manager 104 can be used to store user browsing information. Such user browsing information can include: the web pages visited by users, search queries submitted by users, the manner in which users browse the Internet and search for content on the Internet, and demographic information and interests of the corresponding users. The invention may employ many different methods for obtaining and tracking such information. For example, the content manager can obtain the search queries submitted by users from the query logs of a search engine. The content manager can also be configured to access click logs, for example, in order to track the search results within a search results set that were clicked on by a user. The content manager can also have access to a URL log that stores the URLs of the web pages visited by users. In an embodiment, the content manager may access one or more databases that contain demographic information of users and can associate the users' demographic information with their searching behavior.

User browsing information can be useful as it can be an indicator as to what topics, interests, and other information are popular. Such information regarding the popularity of topics and interests can be useful to a multitude of parties. For example, an advertiser may want to correlate their television-based, or other non-web based, advertising campaigns with resulting increased Internet searches that are related to their advertised service or product. The advertiser could place an television advertisement and could then request the user browsing information that is related to their advertisement for a time interval after the advertisement is shown.

In another example, an advertiser may want to have access to such user browsing information so that it can bid for the keywords of search queries that are frequently submitted by users, or for the web pages that are frequently visited. Additionally, an advertiser may also want to know if a web page that they have an advertisement on is becoming increasingly unpopular so that they can remove their advertisement and possibly put it on a more popular page. Alternatively, an advertiser may want to know if a web page is popular if it is considering placing an advertisement on the web page.

The user browsing information may also be useful to a web page owner as the owner can use the information to find out which topics and interests are popular. The owner may then opt to place information regarding the popular topics and interests on their website in order to attract more users. Alternatively, the web page owner may want to know if a particular topic that is on his/her web page has become decreasingly popular or has a sudden negative appeal so that he/she can remove the topic from their web page.

Additionally, an advertiser may be interested in receiving user browsing information for a geographical location. The advertiser may want to know how well their advertisement campaign is doing at a specific geographical location rather that getting a worldwide aggregate of all searches for their product or service. The invention is able to access the IP address of a user's client and can map the IP address to the location of the user. The invention could then provide the user browsing information of the users corresponding to the location. So, for example, the invention could provide the geographical locations where an increase/decrease of traffic has occurred that is related to their advertisement campaign.

The popularity of topics, interests, and other information can be ephemeral and can change quickly. Therefore, the content manger can be helpful in tracking user browsing information in order to present such information quickly and promptly to a requesting entity. However, not all changes in the popularity of certain information is significant. For example, a certain topic may drop by 10% in popularity one day but may rise back up 20% in popularity the next day. The invention can be configured to monitor all changes of user browsing behavior and create an alert when there has been a significant change in certain browsing behavior.

Figure 2:
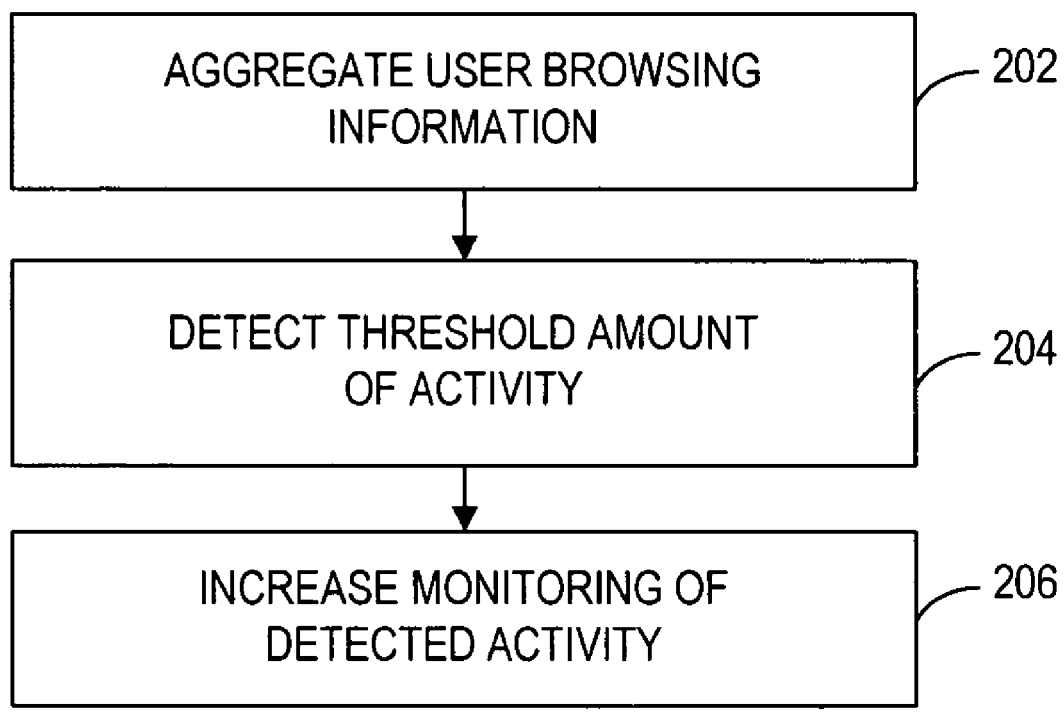
FIG. 2 illustrates an embodiment of a method for monitoring user browsing information.

FIG. 2 illustrates an embodiment of a method for monitoring user browsing information. At operation 202, a plurality of user browsing information can be aggregated. The user browsing information can include, for example, search queries comprising one or more keywords submitted by a user, or web pages visited by a user. The invention can be configured to aggregate the user browsing information periodically at specific time intervals such as once a week, once a day, every hour, every minute, every second, etc. In an embodiment, one type of user browsing information can be aggregated more frequently than another type of user browser information. For example, statistical information regarding the number of users that have visited website "A" can be aggregated every hour whereas statistical information regarding the number of users that have visited website "B" can be aggregated once a day. The same scenario can hold true for keywords within a search query as statistical information of certain search queries, such as the number of times they are used, can be aggregated more frequently than others.

At operation 204, a threshold amount of activity of the user browsing information can be detected. In an embodiment, a query histogram can be used to analyze which search queries are the most popular for a given time period. For example, the query histogram can plot the search queries submitted by users for a day. The search queries can be plotted in an ascending or descending order corresponding to the number of times each search query was submitted for the day. A threshold of activity can be, for example, an increase of 25% or more of usage of a certain search query from one day to the next. So if it was determined by the query histogram that the search query "gas prices" was the $250^{th}$ most used search term one day and the next day it was the $10^{th}$ most popular, then the threshold rate of activity of a 25% or more increase for a day would be detected. Another example could be that the threshold amount of activity is reached if a search query is one of the top 20 search queries, or any other number, for the day.

In another embodiment, the invention can be configured to evaluate the number of times a of web page has been visited by users. For example, a threshold amount of activity could be set for 10,000 hits for one hour. If a web page has 10,000 or more hits within an hour, then the threshold amount of activity will have been reached. In another example, the threshold amount can be reached if the web page is in the top ten of all web pages visited by users in an hour. In still another embodiment, a relative threshold amount of activity can be configured in many different fashions and should not be limited to the examples given above.

In an embodiment, if a threshold amount of activity has been detected, an alert can be automatically transmitted to an administrator or any other entity. In another embodiment, such an alert can be sent to any requesting party. For example, an advertiser may want to have an alert sent to it once the amount of activity of users visiting a certain web page has declined beyond a certain threshold amount so that the advertiser can remove its advertisement. Accordingly, an advertiser can request in advance to receive such an alert.

Once a threshold amount of activity has been detected, at operation 206, the invention can be configured to increase the monitoring of the detected user browsing information. In an embodiment, increasing the monitoring of detected user browsing information can comprise updating the information more frequently. In such an embodiment, statistics for a certain search query, "gas prices" for instance, could have been previously set to be aggregated once every day. If the search query "gas prices" has been detected to reach above a certain threshold of activity, the aggregation of the statistical information for the search query can be increased to once every hour, once every 30 minutes, or once every 5 minutes for example. The same can be true for a web page that has been detected to exceed a certain threshold amount of activity as the aggregation rate of its statistics can increase from once a day to once every hour for example. In an embodiment, the aggregation rate of the statistics of either a search query, web page, demographic information, or any other user browsing information can be decreased if it is detected that the user browsing information has fallen below a certain threshold of activity. For example, a detection that a web page has fallen below a threshold of activity can change the aggregation rate of statistics for the web page from once an hour to once a day.

Embodiments of the invention can further be described with the following example. A certain news event, such as the beginning of baseball's World Series, could spark the interest of many web users. Just prior to and during the World Series, an increasing number web users may submit the search query "world series" into a search engine in order to search for related world series content. The aggregation rate of the query "world series" may normally be set for once a week. An threshold rate of 100,000 hits per week, for example, may be set for the "world series" search query. Once the threshold has been reached, the aggregation rate for aggregating related "world series" content can be changed, for example, from once a week to once every hour. Additionally, an alert can be transmitted to an administrator to inform the administrator of the detection. The administrator can then discern that the increase in activity may be due to the World Series event that will soon take place, and can determine if any additional administrative measures need to be taken. Another alert can also be transmitted to an advertiser who has an interest in the search query "world series" so that the advertiser can possibly know that it may be an opportune time for it to start advertising its World Series related content. Once the World Series is over and interest begins to decline beyond the threshold level of 100,000 hits a week, the aggregation rate may then be returned back to once per week. Alerts may then be sent to interested parties informing them of the change in activity.

Figure 3:
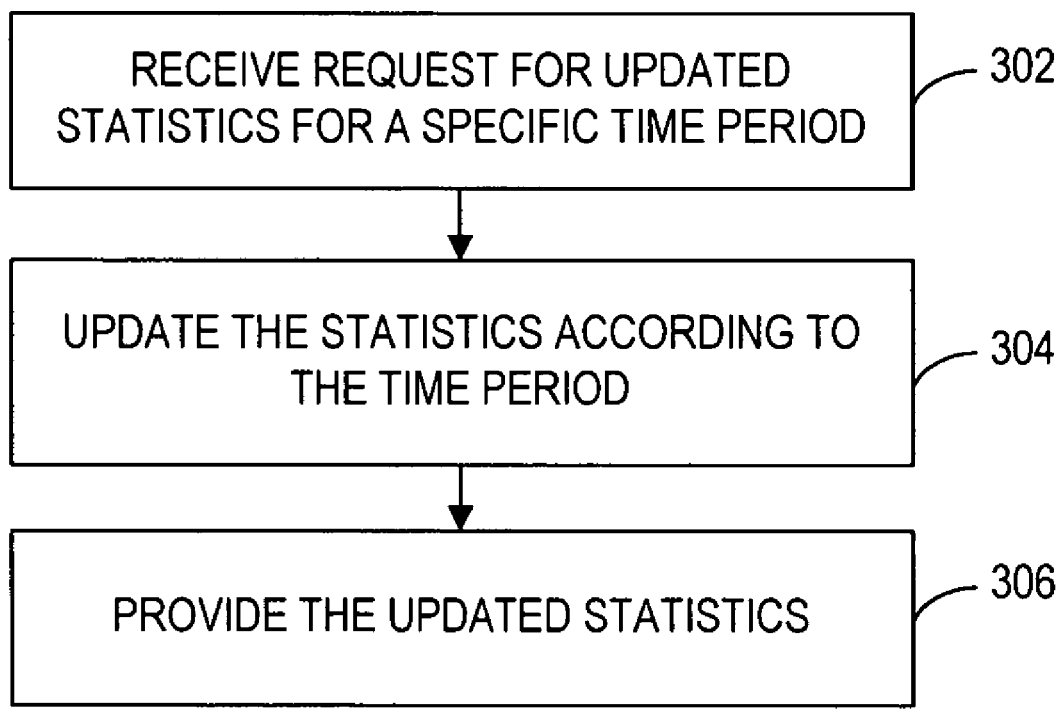
FIG. 3 illustrates an embodiment of a method for providing updated statistics of a type of user browsing information in response to a request for the updated statistics.

FIG. 3 illustrates an embodiment of a method for providing updated statistics of a type of user browsing information in response to a request for the updated statistical information. At operation 302, a request for updated statistics for a certain type of user browsing information is received. The request can include updated statistics for any given time period such as updated statistics up to the past day, hour, minute, sec, etc. At operation 304, the statistics for the requested user browsing information can be updated. In an embodiment, the information can be updated using content manager 104 (FIG. 1). The invention can update the statistics for the requested time period even if the requested time period is different from the statistics' normal aggregation rate. For example, if a requester requests statistical information regarding the number of users that have visited a particular web page up to the past 5 minutes from the request and those statistics are normally aggregated once a day, in an embodiment the content manager can be used to go outside the normal aggregation rate in order to update the statistics according to the request. Once the requested statistics have been updated, at operation 304, the updated statistics can be provided to the requester.

In an embodiment, requesters who request updated statistical information for user browsing information can be charged a price to obtain the information. Many different algorithms can be employed for determining the price for a type of requested information. For example, the price for such information can increase relative to how recently updated the information is to the time the request was submitted or received. In another example, different types of information, such as a the number of times users have visited a page, could be charged more than other types of information, such as the demographic information of users who submitted the search term "gas prices." But again, any type of algorithm can be used to determine methods in which a requester will be charged for such information.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

We claim:

1. A method for monitoring user browsing activity, comprising:

aggregating a plurality of search queries that include one or more keywords, wherein the search queries are user-submitted search queries submitted by way of an Internet search engine;

monitoring the number of user-submitted queries for the plurality of search queries;

detecting a threshold amount of activity for a search query, wherein activity is the number of times the search query is submitted by a user;

receiving a request for updated statistics of a search query, wherein the updated version is for a second time interval that is shorter than a first time interval and the first time interval is one hour or less;

increasing the monitoring frequency of the search query, wherein increasing the monitoring frequency of the detected search query comprises updating statistics of the detected search query more frequently;

updating the statistics of the requested search query according to the second time interval; and providing the updated statistics according to the second time interval.

2. The method according to claim 1, wherein the threshold amount is at least one of rate of increase in popularity of the search query and a rate of decrease of popularity of the search query.

3. The method according to claim 1, wherein the threshold amount of activity is detected through use of a query histogram.

4. The method according to claim 1, further comprising transmitting an alert when the threshold amount of activity has been detected.

5. A method for monitoring user browsing activity, comprising:

aggregating a plurality of web pages visited by a plurality of users;

monitoring an amount of activity of each member of the plurality of web pages, wherein the amount activity is the amount of browsing activity of the web page by the plurality of users;

detecting a threshold amount of activity for a web page, wherein the threshold amount of activity for the webpage is the amount of webpage activity above a predefined amount of activity; and upon detecting the threshold amount of activity, increasing the monitoring frequency of the detected web page, wherein increasing the monitoring frequency from a first time interval to a second time interval includes updating the activity of the detected web page at a more frequent time interval, wherein increasing the monitoring frequency of the detected web page comprises updating statistics of the detected web page more frequently;

receiving a request for updated statistics of a web page, wherein the updated version is for the second time interval that is shorter than the first time interval, wherein the first time interval is one hour or less;

updating the statistics of the requested web page according to the second time interval; and providing the updated statistics according to the second time interval.

6. The method according to claim 5, wherein the threshold amount is at least one of rate of increase in popularity of the web page and a rate of decrease of popularity of the web page.

7. The method according to claim 5, further comprising transmitting an alert when the threshold amount of activity has been detected.

8. One or more computer-readable media having computer-usable instructions stored thereon for performing a method for monitoring user browsing activity, comprising:

aggregating a plurality of search queries that include one or more keywords, wherein the search queries are user-submitted search queries submitted by way of an Internet search engine;

monitoring the number of user-submitted queries for the plurality of search queries;

detecting an amount of activity above a threshold amount of activity for a search query such that the above threshold amount of activity is greater than a predefined activity amount, wherein activity is the number of times the search query is received from a user;

increasing the monitoring frequency of the detected search query, wherein the monitoring frequency increases upon detecting the above threshold amount of activity for the search query;

detecting an amount of activity below the threshold amount of activity for the search query; and decreasing the monitoring frequency of the search query, wherein the monitoring frequency decreases upon detecting the below threshold amount of activity for the search query.

9. The computer-readable media according to claim 8, wherein increasing the monitoring frequency of the detected search query comprises updating statistics of the search query more frequently, further wherein decreasing the monitoring frequency of the search query comprises updating statistics of the search query less frequently.

10. The computer-readable media according to claim 9, wherein the monitoring of the statistics of the detected search query is increased for a first time interval of one hour or less.

11. The computer-readable media according to claim 10, further comprising:

receiving a request for updated statistics of a search query, wherein the updated version is for a second time interval that is shorter than the first time interval;

updating the statistics of the requested search query according to the second time interval; and providing the updated statistics according to the second time interval.

12. The computer-readable media according to claim 8, wherein the threshold amount is at least one of rate of increase in popularity of the search query and a rate of decrease of popularity of the search query.

13. The computer-readable media according to claim 8, wherein the threshold amount of activity is detected through use of a query histogram.

14. The computer-readable media according to claim 8, further comprising transmitting an alert when the above threshold amount of activity and the below threshold amount of activity has been detected.

* * * * *